(12) United States Patent
Yanagida

(10) Patent No.: US 10,957,895 B2
(45) Date of Patent: Mar. 23, 2021

(54) BUSBAR, ELECTRICITY STORAGE MODULE, AND WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Taiji Yanagida, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/470,034

(22) PCT Filed: Dec. 6, 2017

(86) PCT No.: PCT/JP2017/043734
§ 371 (c)(1),
(2) Date: Jun. 14, 2019

(87) PCT Pub. No.: WO2018/116822
PCT Pub. Date: Jun. 28, 2018

(65) Prior Publication Data
US 2020/0106075 A1   Apr. 2, 2020

(30) Foreign Application Priority Data
Dec. 22, 2016   (JP) ............................. JP2016-248915

(51) Int. Cl.
  H01M 2/20   (2006.01)
  H01M 2/10   (2006.01)
  H01M 2/22   (2006.01)

(52) U.S. Cl.
  CPC ......... H01M 2/206 (2013.01); H01M 2/1077 (2013.01); H01M 2/22 (2013.01); H01M 2220/20 (2013.01)

(58) Field of Classification Search
  None
  See application file for complete search history.

(56) References Cited

U.S. PATENT DOCUMENTS

| 2009/0068555 A1 | 3/2009 | Fukuoka et al. |
| 2011/0177381 A1 | 7/2011 | Oya et al. |

(Continued)

FOREIGN PATENT DOCUMENTS

| JP | 2006-294524 | 10/2006 |
| JP | 2013-062218 | 4/2013 |

(Continued)

OTHER PUBLICATIONS

Official Communication issued in International Bureau of WIPO Patent Application No. PCT/JP2017/043734, dated Feb. 13, 2018.

*Primary Examiner* — Victoria H Lynch
(74) *Attorney, Agent, or Firm* — Greenblum & Bernstein, P.L.C.

(57) ABSTRACT

Provided is a busbar configured to establish a connection between adjacent electrode terminals of a plurality of electricity storage elements each including positive and negative electrode terminals, including: a central region and a pair of end regions that are separated by a pair of parallel folding lines extending along an arrangement direction of the adjacent electrode terminals, wherein the pair of end regions are folded using the folding lines, and are placed on top of one (Continued)

surface of the central region such that the end regions do not overlap with each other.

10 Claims, 10 Drawing Sheets

(56) References Cited

U.S. PATENT DOCUMENTS

| | | | |
|---|---|---|---|
| 2012/0015550 A1 | 1/2012 | Ikeda et al. | |
| 2014/0356691 A1* | 12/2014 | Ahn | H01M 2/305 |
| | | | 429/158 |
| 2018/0261953 A1 | 9/2018 | Takahashi et al. | |

FOREIGN PATENT DOCUMENTS

| | | |
|---|---|---|
| JP | 2015-035323 | 2/2015 |
| WO | 2010/052788 | 5/2010 |
| WO | 2011/021614 | 2/2011 |
| WO | 2017/047372 | 3/2017 |

* cited by examiner

BUSBAR, ELECTRICITY STORAGE MODULE, AND WIRING MODULE

TECHNICAL FIELD

The present specification discloses a technique that relates to a busbar that establishes a connection between adjacent electrode terminals of a plurality of electricity storage elements, and an electricity storage module and a wiring module that include the busbar.

BACKGROUND ART

A power supply device installed in an electric car, a hybrid car or the like includes a battery module in which a plurality of cells are arranged and connected.

Such a battery module includes a plate-shaped busbar that establishes an electrical connection between the electrode terminals of adjacent cells. For example, a configuration has been proposed in which the core wire of a detection wire that detects the voltage of the cells is connected to a wire connection portion formed extending in one piece with the busbar, and is guided to a battery ECU. The busbar can be formed, for example, by punching a plate-shaped member into a predetermined shape.

Meanwhile, there is a need to increase the plate thickness of such a busbar in order to reduce the electrical resistance. However, increasing the plate thickness poses the problem of an increase in size of the wire connection portion, resulting in conflicting needs between the retention of the electrical capacity and the size reduction of the wire connection portion.

Therefore, in order to solve such a problem, a configuration has been considered in which a body portion of the busbar that spans the adjacent electrode terminals is formed in a stacked structure, thus increasing the thickness of only the body portion, and maintaining the conventional thickness of the wire connection portion extending from the body portion. That is, a configuration has been proposed that is formed by folding a single metal plate in two using a folding portion, and placing the folded portions on top of each other.

CITATION LIST

Patent Documents

Patent Document 1: WO 2011/021614

SUMMARY OF INVENTION

Technical Problem

However, with the above-described conventional configuration, a deviation may occur in the current flowing between a pair of electrode terminals when the pair of electrode terminals are connected by the busbar. That is, assuming that, of a busbar having a two-layer structure, a layer disposed on the electrode terminal side is a first layer, and a layer placed on top of the first layer is a second layer, a current flowing out from the positive electrode to the negative electrode side also flows from the first layer to the second layer side through the folding portion on the folding portion side, and thus can take a wide current path. However, on the edge portion side, which is located opposite to the folding portion, it is difficult to secure a current path from the first layer to the second layer that is equivalent to the current path on the folding portion side, for example, because of an oxide film or the like interposed between the two layers. Accordingly, a deviation occurs in the current flowing through the busbar, resulting in a significant increase in the overall electrical resistance of the busbar.

The technique disclosed in the present specification has been completed based on the above-described circumstances, and an object thereof is to provide a busbar, an electricity storage module, and a wiring module with which it is possible to inhibit the current density from being deviated even when the busbar is formed in a two-layer structure.

Solution to Problem

The technique disclosed in the present specification is directed to a busbar configured to establish a connection between adjacent electrode terminals of a plurality of electricity storage elements each including positive and negative electrode terminals, including: a central region and a pair of end regions that are separated by a pair of parallel folding lines extending along an arrangement direction of the adjacent electrode terminals, wherein the pair of end regions are folded using the folding lines, and are placed on top of one surface of the central region such that the end regions do not overlap with each other.

With such a busbar, a current flowing out from the positive electrode toward the negative electrode side uniformly flows to both sides of the pair of side edge portions of the busbar, without being deviated to one side. That is, it is possible to secure a current path such that the current flows from the central region connected to the electrode terminals uniformly to the pair of end regions successively provided at on end portions on both sides thereof. Accordingly, it is possible to inhibit the current density from being deviated to one side, thus making it possible to obtain a busbar with excellent electrical resistance.

The above-described busbar may have the following configurations.

A portion of the central region is exposed between the pair of folded end regions, and the exposed central region serves as a connection portion for establishing a connection to the electrode terminals.

In the case of conductively connecting the busbar and the electrode terminals to each other through laser welding, for example, the laser output cannot be easily adjusted when the busbar has a large thickness, or the connection portion is formed in a stacked structure. That is, a small laser output may result in poor connection, and a large laser output may cause damage to the electrode terminals as a result of the laser penetrating the busbar.

To address this problem, the above-described configuration allows laser welding to be performed in a region (exposed central region) formed as a single layer having a relatively small thickness. Accordingly, the laser output can be easily adjusted, thus making it possible to prevent a poor connection and damage to the electrode terminals. That is, it is possible to increase the connection reliability.

In the case of conductively connecting the busbar and the electrode terminals to each other using a fastening member, for example, the torque cannot be easily managed when the connection portion of the busbar is formed in a stacked structure, for example, because of uplifting of the stacked portion or the presence of a foreign object. Accordingly, the connection reliability may be reduced.

In contrast, with the above-described configuration, connection can be established in the region formed as a single layer using the fastening member, and it is therefore possible to increase the connection reliability.

Cut-out recesses for exposing a connection portion for establishing a connection to the electrode terminals may be respectively provided at mutually opposing end edge portions of the pair of folded end regions.

With this configuration, a region (connection portion) of the central region that is necessary to establish a connection to the electrode terminals can be exposed by the cut-out recesses, and regions other than the connection portion can be formed in a two-layer structure. Accordingly, it is possible to secure a larger cross-sectional area for the busbar. That is, it is possible to reduce the electrical resistance of the busbar.

The connection portion may be provided with positioning holes that allow insertion of protruding portions respectively provided on the electrode terminals.

With this configuration, the electricity storage elements and the busbar can be easily positioned relative to each other by fittingly inserting protruding portions, such as positioning protrusions or electrode posts, provided on the electrode terminal side into the positioning holes of the busbar.

The cut-out recesses may be disposed on peripheries of the respective corresponding positioning holes, and a boundary portion between the cut-out recesses and the exposed central region may be formed in a stepped shape.

With this configuration, it is possible to simultaneously laser-weld the portion formed in a stepped shape at the boundary between the central region and the end regions of the busbar when the busbar and the electrode terminals are conductively connected through laser welding, in addition to the connection portion of the busbar and the electrode terminals. That is, a wide current path can be reliably secured, and it is therefore possible to reduce the electrical resistance of the busbar.

A wire connection portion that is to be connected to a terminal end portion of a detection wire that detects a state of the electricity storage elements may be provided in one piece with the busbar.

The technique disclosed in the present specification is also directed to an electricity storage module in which a connection between adjacent electrode terminals of a plurality of electricity storage elements each including positive and negative electrode terminals is established by the above-described busbar, wherein the exposed central region of the busbar and the electrode terminals are connected to each other through laser welding.

A boundary portion between end edge portions of the folded end regions and the central region may be welded.

A portion in which the folded end regions and the central region are stacked may be welded.

Furthermore, the technique disclosed in the present specification is directed to a wiring module including: the above-described busbar; a detection wire that detects a state of the electricity storage elements; and an insulating protector that holds the busbar and the detection wire.

Advantageous Effects of Invention

With the technique disclosed in the present specification, it is possible to obtain a busbar, an electricity storage module, and a wiring module that have excellent electrical resistance without the current density being deviated even when the busbar is formed in a two-layer structure.

DESCRIPTION OF EMBODIMENTS

Figure 1:
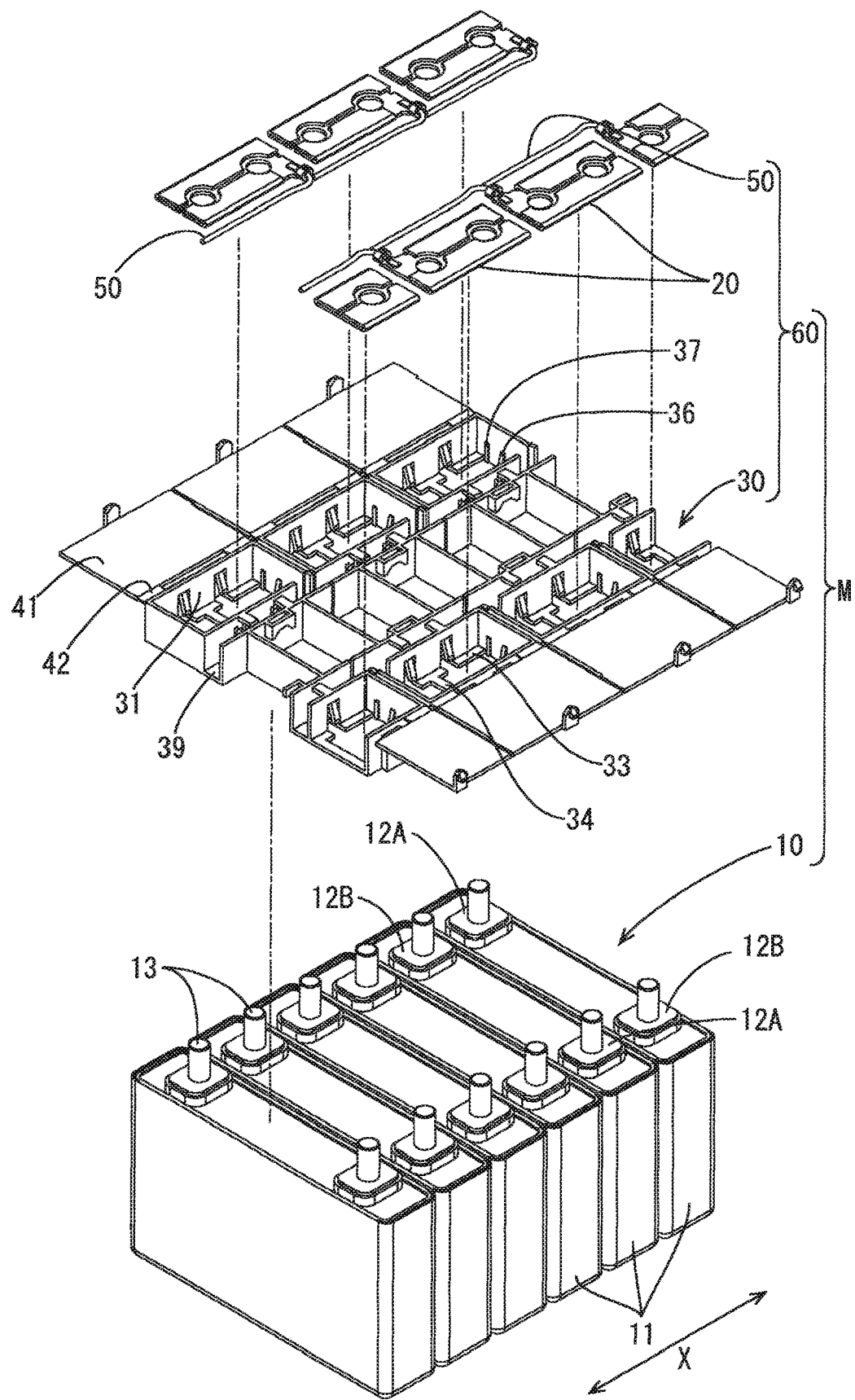
FIG. 1 is an exploded perspective view of a battery module according to an embodiment.

An embodiment will be described with reference to FIGS. 1 to 10. A busbar 20 according to the present embodiment establishes a connection between adjacent electrode terminals 12 of a plurality of cells 11 (an example of the electricity storage element) constituting a cell group 10 installed in an electric car, a hybrid car, or the like. The busbar 20, together with a detection wire 50, is held by an insulating protector 30 (wiring module 60), and is wholly attached to an electrode placement surface of the cell group 10, thus forming a battery module M (an example of the electricity storage module). Note that, in the following description, upward refers to upward in FIG. 1, and downward refers to downward in FIG. 1.

Cell 11

As shown in FIG. 1, each cell 11 has the shape of a flat, substantially rectangular solid. A power generating element (not shown) is accommodated in the cell 11. A pair of electrode terminals 12A and 12B are formed protruding upward from the upper surface of the cell 11 at positions located toward opposite end portions in the longitudinal direction. The upper surface of the cell 11 serves as an electrode placement surface. One of the pair of electrode terminals 12A and 12B is a positive electrode terminal, and the other is a negative electrode terminal. The electrode terminal 12A constituting the positive electrode terminal and the electrode terminal 12B constituting the negative electrode terminal have the same shape and size. A columnar positioning protrusion 13 (an example of the protruding portion) that protrudes upward is provided at the center of each of the electrode terminals 12A and 12B. The plurality of cells 11 are arranged such that adjacent electrode terminals 12 have different polarities, thus forming the cell group 10. Adjacent cells 11 are electrically connected by the busbar 20.

Busbar 20

Figure 4:
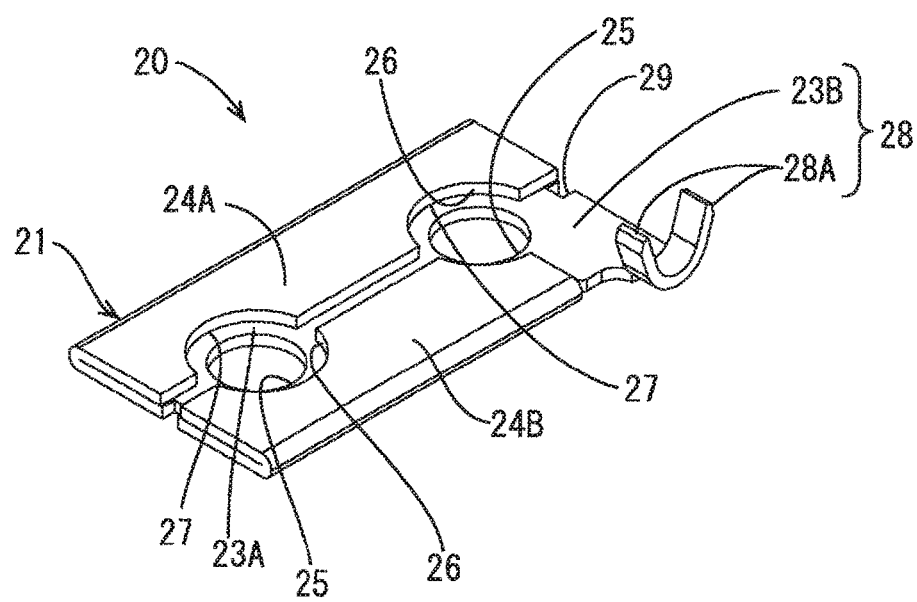
FIG. 4 is a perspective view of the busbar.
Figure 5:
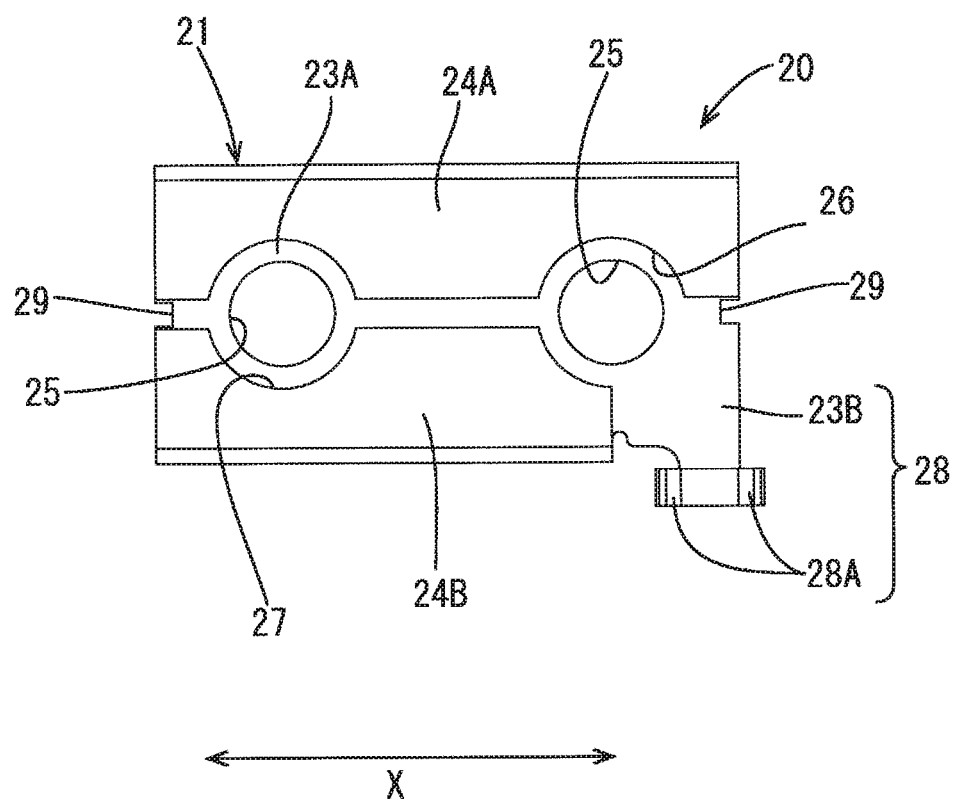
FIG. 5 is a plan view of the busbar.
Figure 6:
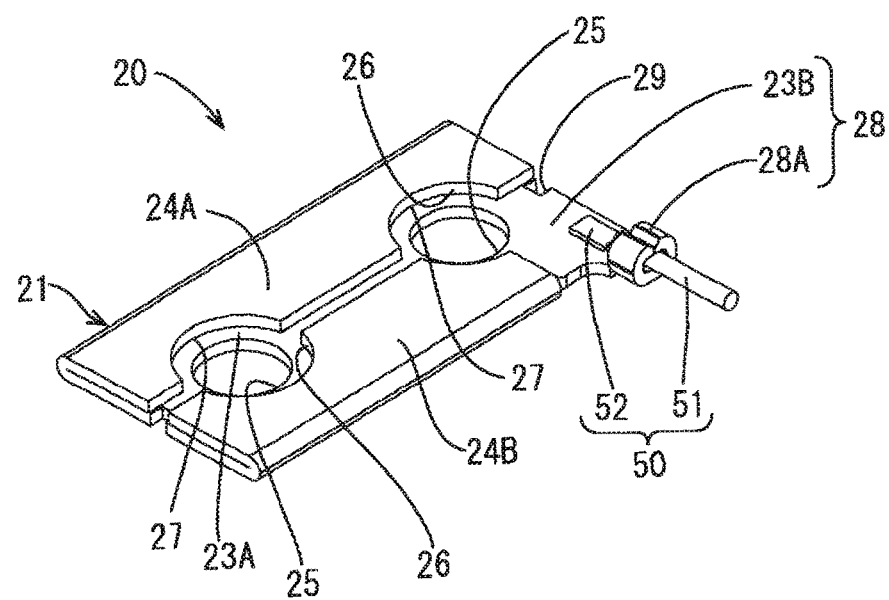
FIG. 6 is a perspective view of the busbar to which a detection wire is connected.
Figure 7:
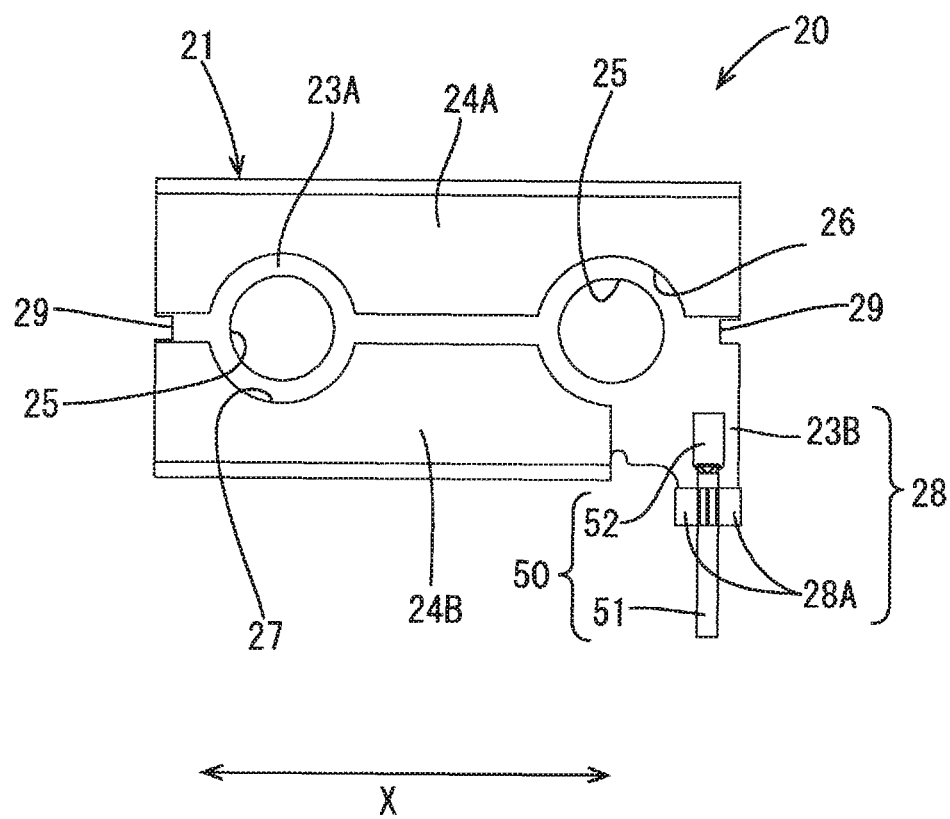
FIG. 7 is a plan view of the busbar to which a detection wire is connected.
Figure 8:
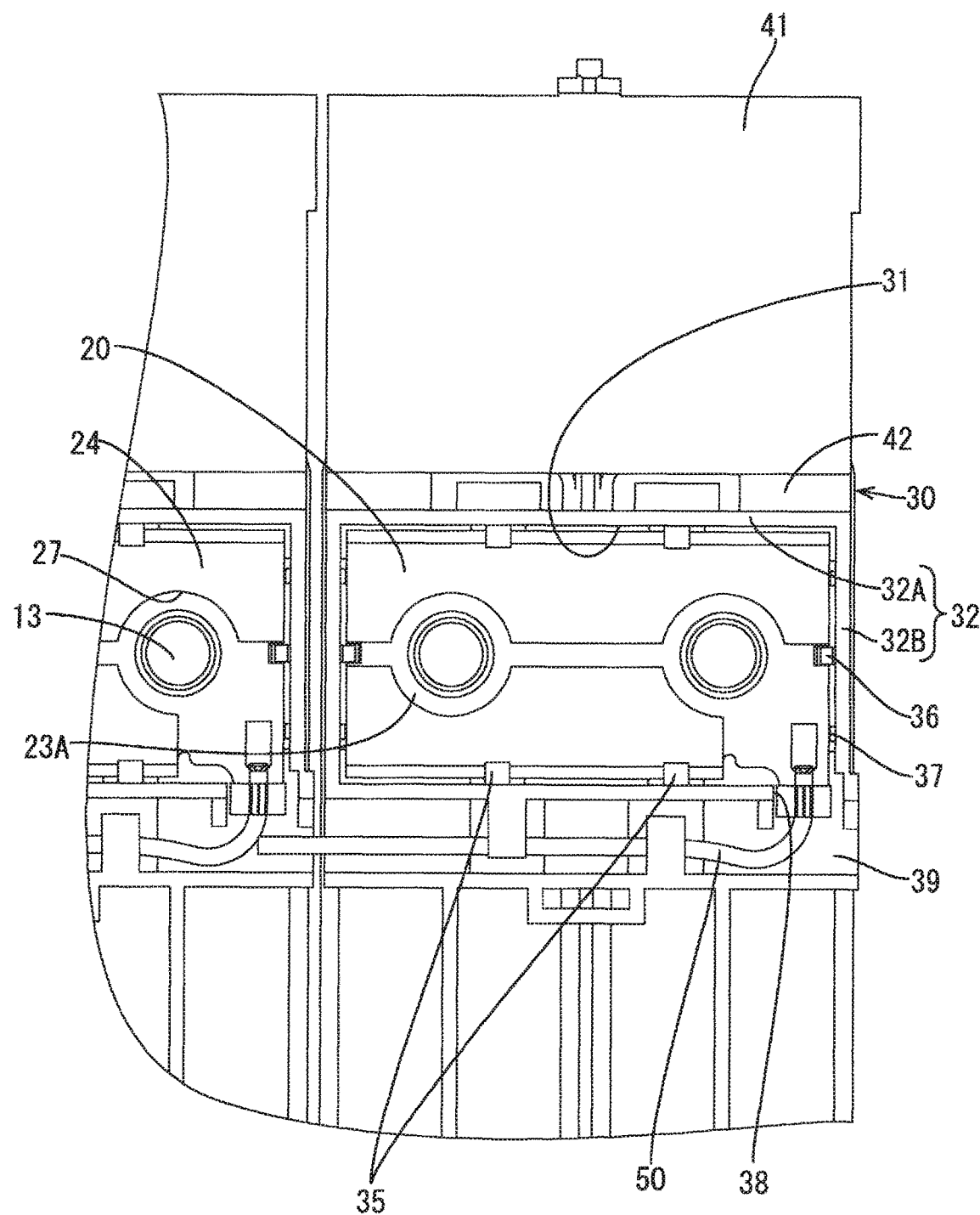
FIG. 8 is a partially enlarged plan view of the battery module before laser welding.

The busbar 20 according to the present embodiment is formed, for example, by punching and pressing a metal plate material made of copper, a copper alloy, a stainless steel (SUS), aluminum, or the like, and includes, as shown in FIGS. 4 and 5, a rectangular plate-shaped body portion 21 that spans adjacent electrode terminals 12 of a cell 11, and a wire connection portion 28 that is to be connected to a terminal end portion of the detection wire 50. A pair of circular positioning holes 25 for passing therethrough the positioning protrusions 13 of the electrode terminals 12 are formed in the body portion 21 so as to extend through the plate surface thereof.

The body portion 21 is formed in a two-layer structure in which a pair of opposing end portions of a substantially rectangular plate-shaped member are folded inward.

Figure 2:
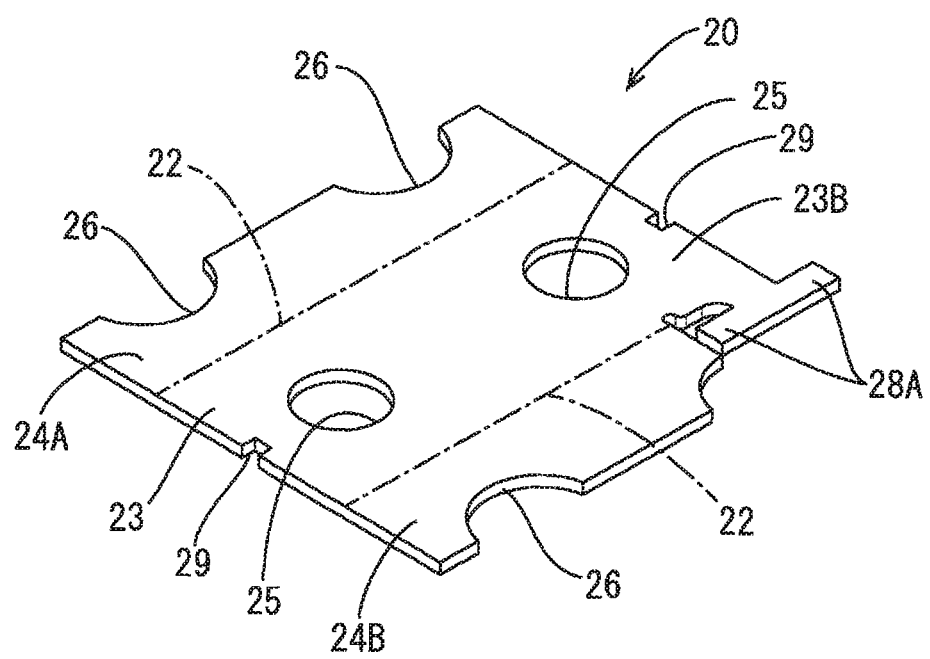
FIG. 2 is a perspective view of a busbar in a developed state.
Figure 3:
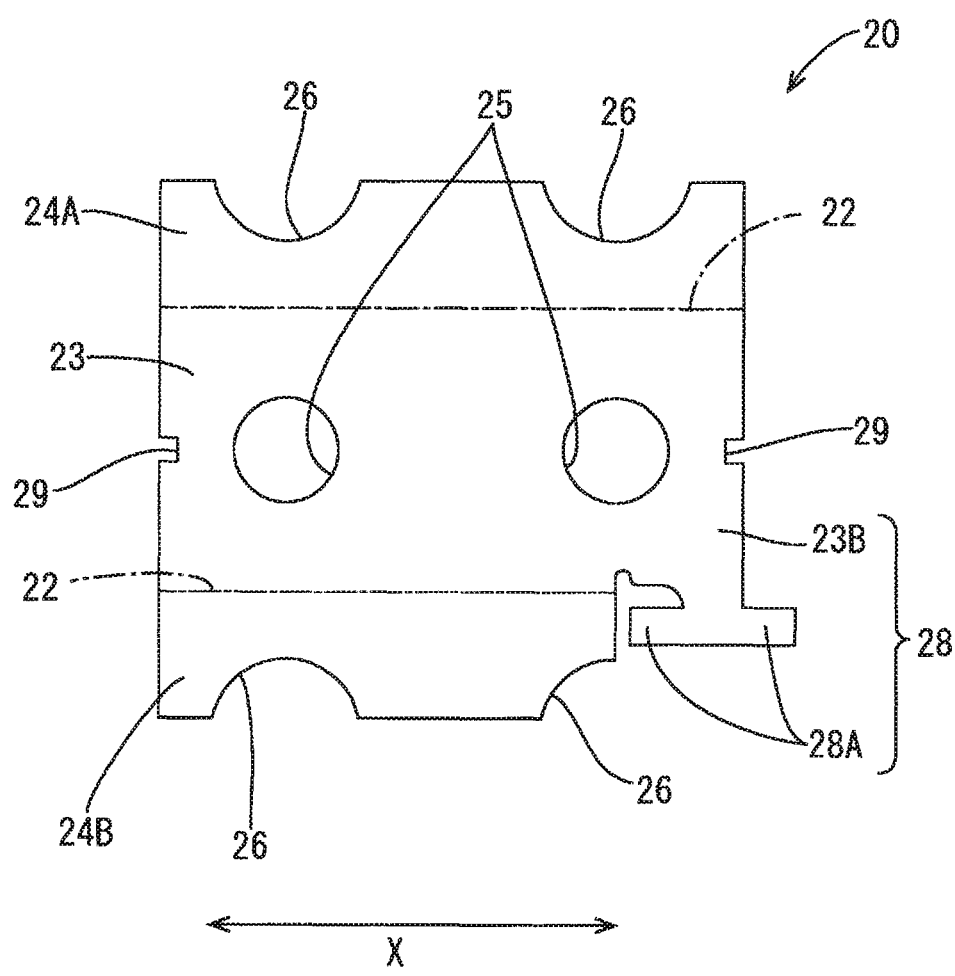
FIG. 3 is a plan view of the busbar in a developed state.

More specifically, as shown in FIGS. 2 and 3, a pair of virtual folding lines 22 extending in parallel in the X direction in FIG. 3 (an example of the arrangement direction of adjacent electrode terminals) are set on a plate-shaped member in a developed form. A rectangular region disposed between the pair of folding lines 22 is a central region 23, and regions on both sides of the central region 23 that are located outward of the folding lines 22 (upward and downward in FIG. 3) are end regions 24 (hereinafter the upper side in FIG. 3 is referred to as a "first end region 24A", and the lower side in FIG. 3 is referred to as a "second end region 24B").

The widths (dimensions in the up-down direction in FIG. 3) of the pair of end regions 24A and 24B are set to be equal. The width of the central region 23 is set to be slightly greater than twice the width of one end region 24.

Accordingly, in a state in which the pair of end regions 24A and 24B are folded using the folding lines 22, and are placed on top of the central region 23, the pair of end regions 24A and 24B form a gap between the mutually opposing end edge portions thereof (see FIGS. 4 and 5).

Note that the pair of positioning holes 25 described above are formed in alignment in the extension direction of the folding lines 22 (in the X direction in FIGS. 3 and 5).

In a state in which the pair of end regions 24A and 24B are placed on top of the central region 23, cut-out recesses 26 are provided in the mutually opposing end edge portions of the pair of end regions 24A and 24B at positions corresponding to the positioning holes 25. Each cut-out recess 26 is formed in an arc shape in which the edge portion thereof is located on the periphery of the corresponding positioning hole 25, or in other words, located outward of the corresponding positioning hole 25 such that the edge portion thereof surrounds the opening edge portion of the positioning hole 25. Consequently, a boundary portion between the cut-out recess 26 and the central region 23 is formed in a stepped shape (hereinafter the boundary portion is referred to as a "stepped portion 27"). The central region 23 is exposed around each positioning hole 25, and the exposed portion serves as a connection portion 23A that is to be conductively connected to the electrode terminals 12 (see FIG. 4).

In the second end region 24B, a region of one cut-out recess 26 (the right side in FIG. 3) of the pair of cut-out recesses 26 that is located outward of the center line is cut-out, and a portion of the wire connection portion 28 is provided extending in one piece with the central region 23. The wire connection portion 28 includes a pair of pair of barrel pieces 28A that bulge laterally in the extension direction thereof. The pair of barrel pieces 28A are crimped around an insulating covering 51 of the detection wire 50.

Of the central region 23, a region in which the second end region 24B is cut out and exposed in order to provide the wire connection portion 28 serves as a core wire connection portion 23B to which a core wire 52 exposed from a terminal end of the detection wire 50 is to be welded. The core wire connection portion 23B and the pair of barrel pieces 28A form the wire connection portion 28.

Additionally, at the center of each of the side edges on the shorter side of the rectangular central region 23 of the busbar 20, a guide recess 29 that has been cut out inward from the side edge into the form of a recess, and into which a guide rib 36, which will be described below, is fittingly inserted is provided.

Such a busbar 20 according to the present embodiment can be produced, for example, in the following manner.

First, a plate-shaped member made of metal is punched into a developed form as shown in FIGS. 2 and 3.

Subsequently, the pair of end regions 24A and 24B are folded along the folding lines 22 through pressing, and are placed on top of the same surface of the central region 23. Simultaneously, the pair of barrel pieces 28A of the wire connection portion 28 are curved at a predetermined angle. Thus, a busbar 20 according to the present embodiment is completed (see FIGS. 4 and 5).

Insulating Protector 30

Figure 9:
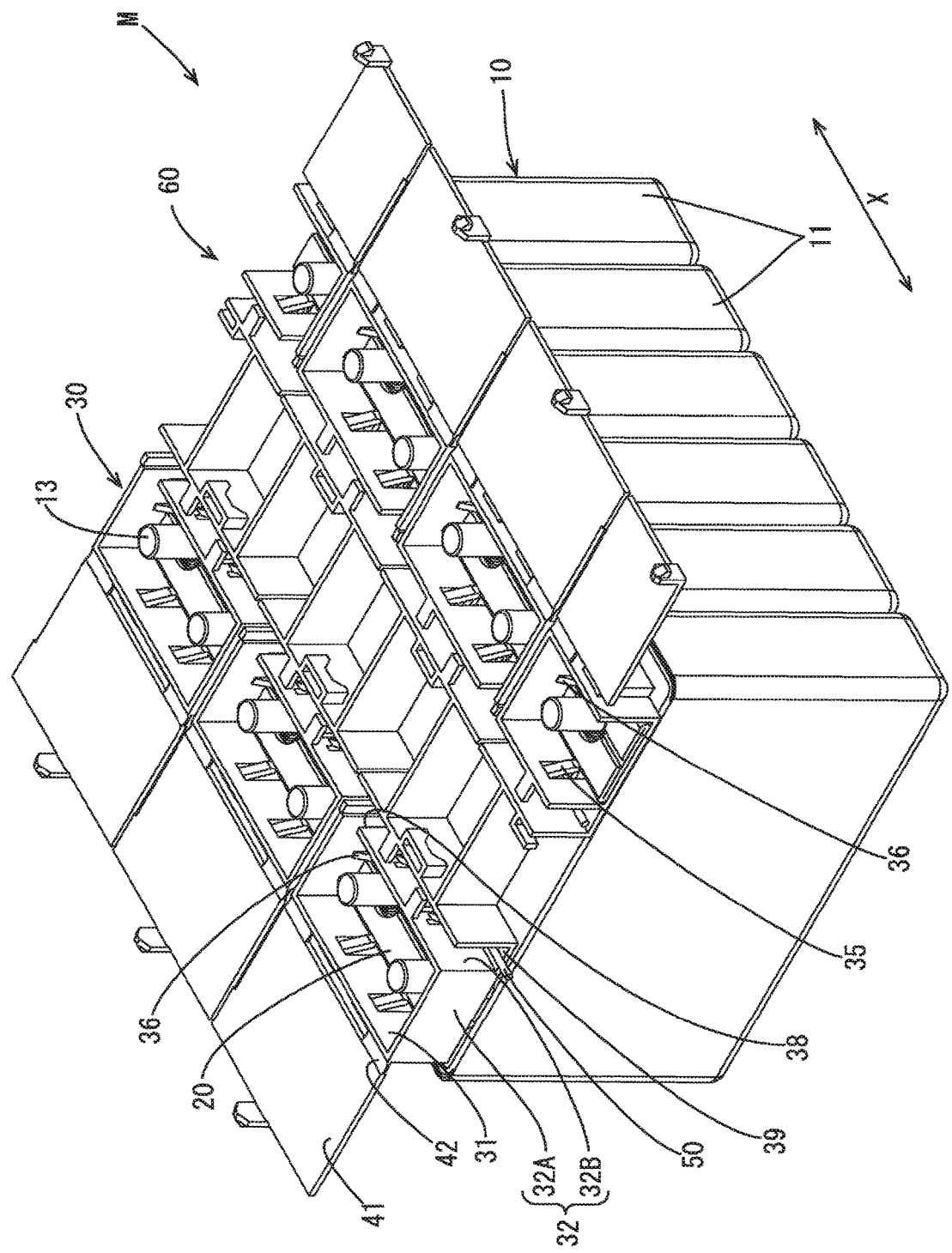
FIG. 9 is a perspective view of the battery module.
Figure 10:
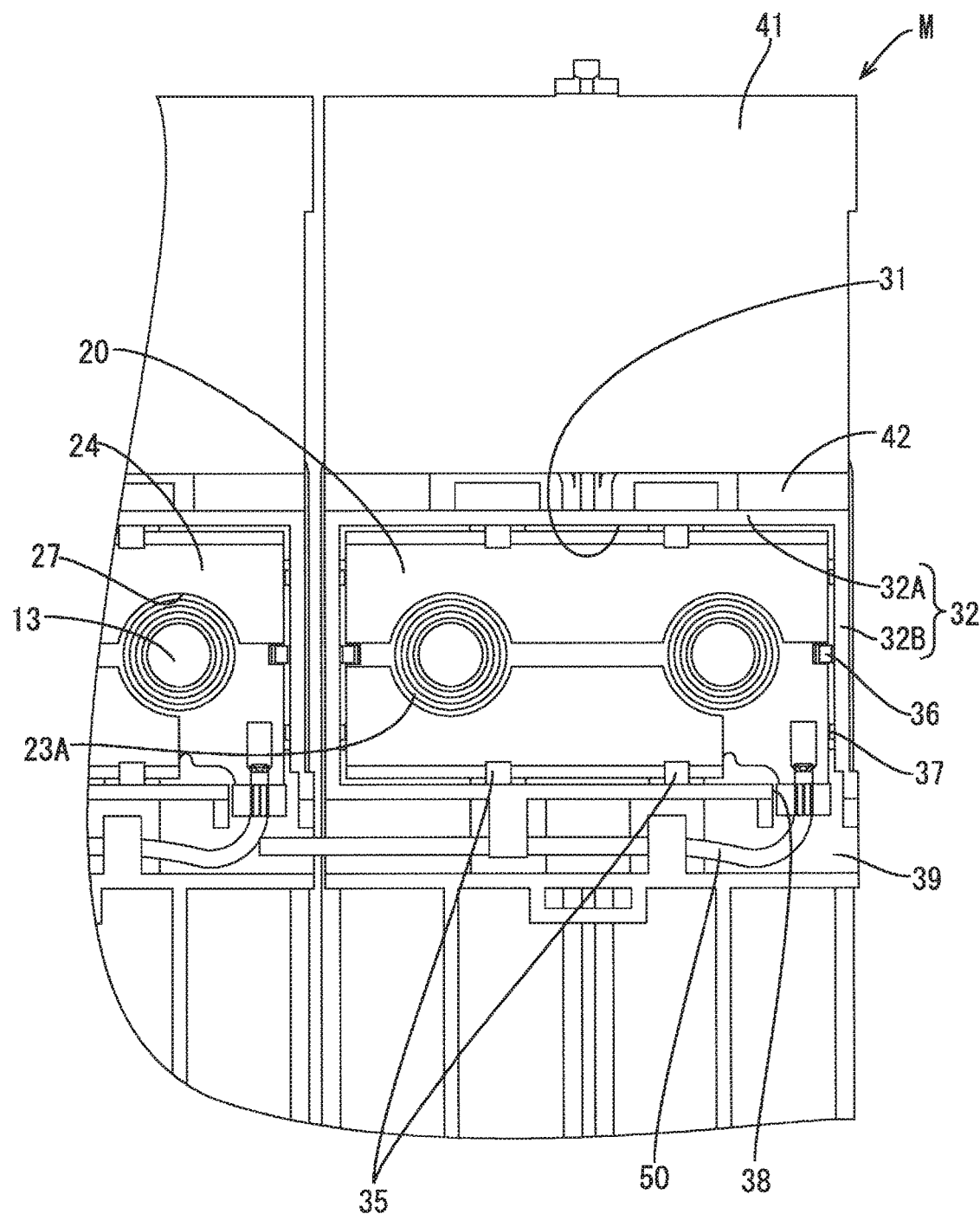
FIG. 10 is a partially enlarged plan view of the battery module.

As shown in FIGS. 1 and 9, the insulating protector 30 according to the present embodiment includes a plurality of busbar holding portions 31 that are open in the up-down direction and accommodate and hold busbars 20, and wire accommodating grooves 39 for accommodating the detection wires 50 connected to the busbars 20.

The busbar holding portions 31 are arranged in two rows along the arrangement direction of the cells 11 (the arrangement direction X of adjacent electrode terminals 12), and the wire accommodating grooves 39 are disposed adjacent to, and on the inner side of the two rows of busbar holding portions 31. In addition, a protection cover 41 is provided in one piece with each of the busbar holding portions 31 via a hinge 42 at the upper end of a peripheral wall 32 of the busbar holding portion 31, and the protection cover 41 is configured to cover the busbar holding portion 31 from above.

Of the rectangular tubular peripheral wall 32 of one busbar holding portion 31, side edge placement portions 33 protruding slightly inward are provided at lower end portions of a pair of long side wall portions 32A extending in the long-length direction (the arrangement direction of the cells 11). In addition, an intermediate placement portion 34 extending bridging the lower end portions of the pair of long side wall portions 32A are provided at the central portion of one busbar holding portion 31 in the long-length direction. Of the peripheral wall 32, rectangular openings that are surrounded by a pair of short length-side wall portions 32B extending in the short-length direction of the busbar holding portion 31, a pair of side edge placement portions 33, and the intermediate placement portion 34, and that are open in the up-down direction are set to have dimensions such that the electrode terminals 12 of each cell 11 are substantially tightly fitted thereinto.

As shown in FIGS. 1 and 9, for example, a plurality of locking pieces 35 for preventing the busbar 20 from falling off to the upper side are provided on the inner side of the peripheral wall 32 of one busbar holding portion 31. A pair of locking pieces 35 are provided for each long length-side wall portion 32A (a total of four locking pieces 35 for each busbar holding portion 31), and each locking piece 35 is formed by cutting out the side edge placement portion 33 and the long length-side wall portion 32A from the lower side, and being bulged inward in a cantilever manner.

The pair of short length-side wall portions 32B of one busbar holding portion 31 are each provided with a guide rib 36 for accommodating the busbar 20 in a proper orientation inside the busbar holding portion 31. Each guide rib 36 is provided at the central portion of the corresponding short-length side wall portion 32B in the width direction so as to extend in the up-down direction, and is configured to protrude while being inclined inward from the upper side toward the lower side. On both sides of the guide rib 36 on the short-length side wall portion 32B, a pair of support ribs 37 that support the side edge portions of the busbar 20 from the lateral sides are provided extending in the up-down direction and bulging inward.

Additionally, a wire cut-out portion 38 for putting, into the wire accommodating groove 39, the wire connection portion 28 of the busbar 20 and the detection wire 50 connected to the wire connection portion 28 is provided in the long length-side wall portion 32A adjacent to the wire accommodating groove 39 of the pair of long side wall portions 32A of the busbar holding portion 31, at a position corresponding to the wire connection portion 28 of the busbar 20.

Next, the method for mounting the wiring module 60 will be described.

First, the insulating covering 51 is stripped off at a terminal end portion of the detection wire 50, to expose the core wire 52, and the core wire 52 is placed on the core wire connection portion 23B of the busbar 20. Also, an end portion of the insulating covering 51 is crimped by the pair of barrel pieces 28A of the wire connection portion 28 of the busbar 20. Then, the core wire 52 of the detection wire 50 and the busbar 20 are electrically connected to each other through ultrasonic welding, for example.

Next, the busbar 20 to which the detection wire 50 has been connected is accommodated in the busbar holding portion 31 of the insulating protector 30, and the detection wire 50 is accommodated in the wire accommodating groove 39.

More specifically, the body portion 21 of the busbar 20 is brought closer to the busbar holding portion 31 from above, and is pushed downward thereinto. Then, the guide ribs 36 provided on the peripheral wall 32 (short-length side wall portions 32B) of the busbar holding portion 31 are fitted into the guide recesses 29 of the busbar 20, and the support ribs 37 support the side edge portions of the busbar 20 from the lateral sides, thus accommodating the busbar 20 in a proper orientation in the busbar holding portion 31. In this accommodation process, two pairs of locking pieces 35 are elastically deformed outward, thus allowing the passage of the busbar 20.

In a state in which the busbar 20 has reached a proper position in the busbar holding portion 31, the lower surface of the busbar 20 is supported by the side edge placement portions 33 and the intermediate placement portion 34 from the lower side. In addition, the locking pieces 35 provided on the peripheral wall 32 are elastically restored and lock to the upper surface of the busbar 20, thus preventing the busbar 20 from falling off to the upper side. In this state, the wire connection portion 28 is disposed in the wire cut-out portion 38, and the detection wire 50 is pulled to the wire accommodating groove 39 side.

Thereafter, the detection wire 50 is routed in the wire accommodating groove 39. Thus, a wiring module 60 is completed.

The wiring module 60 of the present embodiment assembled in this manner is attached to the electrode placement surface of the cell group 10. Specifically, the wiring module 60 is attached to the cell group 10, while being positioned such that the electrode terminals 12 are fitted in the opening on the lower side of the insulating protector 30. In a state in which the wiring module 60 is attached to a proper position relative to the cell group 10, the positioning protrusions 13 of the electrode terminals 12 are fitted in the positioning holes 25 of each busbar 20, and the lower surface of the busbar 20 and the electrode surfaces of the electrode terminals 12 are placed on top of, and in contact with each other (see FIG. 8).

Next, laser is applied from the upper side to the portion surrounding the positioning protrusions 13, i.e., the connection portion 23A, thus conductively connecting the busbar 20 and the electrode terminals 12 to each other through laser welding. Alternatively, the stepped portion 27 may be laser-welded, thus conductively connecting the boundary portion between the central region 23 and the end regions 24 of the busbar 20. Furthermore, laser welding may be performed from the upper surfaces of the end regions 24, thus welding a portion in which the central region 23 and the end regions 24 are stacked.

Thus, a battery module M is completed.

Operations and Effects of the Present Embodiment

With the busbar 20 and the battery module M according to the present embodiment, the pair of end regions 24A and 24B of each busbar 20 are folded using the folding lines 22, and are placed on top of one surface of the central region 23 such that the end regions 24A and 24B do not overlap with each other. Accordingly, a current flowing out from the positive electrode toward the negative electrode side substantially uniformly flows to both sides of the pair of side edge portions of the busbar 20, without being deviated to one side thereof. That is, it is possible to secure a current path such that the current flows from the central region 23 connected to the electrode terminals 12 substantially uniformly to the pair of end regions 24A and 24B, and it is thus possible to inhibit the current density from being deviated to one side, thus obtaining a busbar 20 and a battery module M that have excellent electrical resistance.

A portion of the central region 23 of the busbar 20 is exposed between the pair of folded end regions 24A and 24B, and the exposed central region 23 serves as the connection portion 23A for establishing a connection to the electrode terminals 12. Accordingly, the busbar 20 can be laser-welded to the electrode terminals 12 in a region formed as a single layer having a relatively small thickness. Therefore, it is possible to inhibit the laser output from being decreased to result in poor connection, or, conversely, being increased to cause damage to the electrode terminal 12, thus obtaining a battery module M with high connection reliability.

Moreover, the cut-out recesses 26 for exposing the connection portion 23A for establishing a connection to the electrode terminal 12 are provided in the mutually opposing end edge portions of the pair of folded end regions 24A and 24B. Accordingly, much of the region of the busbar 20 other than the connection portion 23A that is to be connected to the electrode terminal 12 can be formed in a two-layer structure. That is, it is possible to further increase the cross-sectional area of the busbar 20, thus reducing the electrical resistance.

The positioning holes 25 are provided in the connection portion 23A, and the positioning protrusions 13 of the electrode terminals 12 can be fittingly inserted into the positioning holes 25. Accordingly, it is possible to easily position the terminals 12 (cell 11) and the busbar 20 relative to each other.

Each cut-out recess 26 is disposed on the periphery of the corresponding positioning hole 25, and the boundary portion between the cut-out recess 26 and the exposed central region 23 is formed as the stepped portion 27. Accordingly, it is possible to laser-weld the stepped portion 27 at the same time when the busbar 20 and the electrode terminals 12 are conductively connected to each other through laser welding. That is, the edge portions of the end regions 24 and the central region 23 can be reliably connected to each other, thus making it possible to secure a wider current path. Accordingly, it is possible to reduce the electrical resistance of the busbar 20.

Furthermore, a portion in which the folded end regions 24A and 24B and the central region 23 are stacked is also laser-welded, and it is therefore possible to reliably secure a current path also on this stacked portion. Accordingly, it is possible to further reduce the electrical resistance.

Other Embodiments

The technique disclosed in the present specification is not limited to the above described and illustrated embodiment, and, for example, the following embodiments also fall within the technical scope.

(1) Although a gap is provided between the pair of folded end regions 24A and 24B in the above embodiment, it is possible to adopt a configuration in which end edge portions abut against each other. In that case as well, the connection portion 23A can be exposed using the cut-out recesses 26.

(2) Although the above embodiment adopts a configuration in which the cut-out recesses 26 are provided, it is also possible to adopt a configuration in which the connection portion 23A is exposed by providing a wide gap between the pair of end regions 24A and 24B, without providing the cut-out recesses 26.

(3) Alternatively, laser welding to the electrode terminals 12 may be performed at a portion in a stacked state in which the end regions 24A and 24B and the central region 23 are stacked, without exposing the central region 23 (connection portion 23A) between the pair of end regions 24A and 24B.

(4) Although each cut-out recess 26 has an arc shape along the opening edge portion of the corresponding positioning hole 25 in the above embodiment, the cut-out recess 26 may have any form, including, for example, a rectangular shape, a triangular shape or the like that surrounds the positioning hole 25.

(5) Although the above embodiment adopts a configuration in which laser welding is performed on the boundary portion between the end edge portions of the end regions 24 and the central region 23, i.e., the stepped portions 27, the laser welding for the stepped portions 27 may be omitted.

(6) Although the above embodiment adopts a configuration in which laser welding is performed on the stacked portion in which the end regions 24 and the central region 23 are stacked, laser welding for the stacked portion may be omitted.

(7) Although the above embodiment adopts a configuration in which each cut-out recess 26 is disposed on the periphery of the corresponding positioning hole 25, and the central region 23 is exposed on the inner side of the cut-out recess 26, the edge portion of the cut-out recess 26 may be overlapped with the opening edge of the positioning hole 25. In this case, as described above, welding to the electrode terminals 12 is performed at the portion in which the end regions 24 and the central region 23 is welded.

(8) The positioning protrusions 13 of the electrode terminals 12 and the positioning holes 25 of the busbar 20 may be omitted.

(9) Although the above embodiment adopts a configuration in which the busbar 20 and the electrode terminals 12 are connected to each other through laser welding, it is possible to adopt a configuration in which they are connected through bolt fastening.

(10) Although the above embodiment adopts a configuration in which the busbar 20 and the detection wire 50 are connected to each other through laser welding, it is possible to adopt a configuration in which a wire barrel for crimping the core wire to the wire connection portion is provided, and the busbar 20 and the detection wire 50 are conductively connected through crimping.

(11) Alternatively, the wire connection portion may be omitted. In that case, a detection terminal may be separately provided and connected.

(12) The outer shape of the busbar 20 is not limited to a rectangular shape, and may be any shape, including, for example, an L-shape. Simply put, it is possible to adopt any form in which the regions between adjacent electrode terminals 12 are symmetrical.

LIST OF REFERENCE NUMERALS

10 Cell group
11 Cell (electricity storage element)
12 Electrode terminal
13 Positioning protrusion (protruding portion)
20 Busbar
22 Folding line
23 Central region
23A Connection portion
24 End region
25 Positioning hole
26 Cut-out recess
27 Stepped portion
28 Wire connection portion
30 Insulating protector
31 Busbar holding portion
39 Wire accommodating groove
50 Detection wire
60 Wiring module
M Battery module (electricity storage module)
X Arrangement direction of adjacent electrode terminals

The invention claimed is:

1. A busbar configured to establish a connection between adjacent electrode terminals of a plurality of electricity storage elements each including positive and negative electrode terminals, comprising:
    a central region and a pair of end regions that are separated by a pair of parallel folding lines extending along an arrangement direction of the adjacent electrode terminals,
    wherein the pair of end regions are folded along the folding lines, and are placed on top of one surface of the central region such that the end regions do not overlap with each other.

2. The busbar according to claim 1,
    wherein a portion of the central region is exposed between the pair of folded end regions, and the exposed portion of the central region serves as a connection portion for establishing a connection to the electrode terminals.

3. The busbar according to claim 1,
    wherein cut-out recesses configured to expose a connection portion for establishing a connection to the electrode terminals are respectively provided at mutually opposing end edge portions of the pair of folded end regions.

4. The busbar according to claim 2,
    wherein the connection portion includes positioning holes configured to receive protruding portions respectively provided on the electrode terminals.

5. The busbar according to claim 3,
    wherein the connection portion includes positioning holes configured to receive protruding portions respectively provided on the electrode terminals, the cut-out recesses are disposed on peripheries of the respective corresponding positioning holes, and a boundary portion between the cut-out recesses and an exposed portion of the central region is formed in a stepped shape.

6. The busbar according to claim 1,
wherein a wire connection portion configured to be connected to a terminal end portion of a detection wire that detects a state of the plurality of electricity storage elements is provided in one piece with the busbar.

7. An electricity storage module in which a connection between adjacent electrode terminals of a plurality of electricity storage elements each including positive and negative electrode terminals is established by the busbar according to claim 1,
wherein an exposed portion of the central region of the busbar and the electrode terminals are connected to each other through laser welding.

8. The electricity storage module according to claim 7,
wherein a boundary portion between end edge portions of the folded end regions and the central region is welded.

9. The electricity storage module according to claim 7,
wherein a portion in which the folded end regions and the central region are stacked is welded.

10. A wiring module comprising:
the busbar according to claim 1; a detection wire that detects a state of the plurality of electricity storage elements; and an insulating protector that holds the busbar and the detection wire.

\* \* \* \* \*